United States Patent [19]
Reichental et al.

[11] Patent Number: 5,794,406
[45] Date of Patent: Aug. 18, 1998

[54] FOAM CUSHIONING PANELS FOR PACKAGING PURPOSES

[75] Inventors: Abraham N. Reichental, Southbury; Kenneth P. Chrisman, Monroe; Alexander Shafir, Watertown, all of Conn.; Michael C. Ruscitti, Boxmeer, Netherlands; George T. Bertram, Newtown, Conn.

[73] Assignee: Sealed Air Corporation, Saddle Brook, N.J.

[21] Appl. No.: 724,736

[22] Filed: Oct. 2, 1996

[51] Int. Cl.⁶ .............................. B65B 9/06; B65B 23/00; B65B 61/02; B65B 61/24

[52] U.S. Cl. .................... 53/410; 53/436; 53/451; 53/472; 53/113; 53/128.1; 53/526; 53/552

[58] Field of Search ........................... 53/410, 451, 439, 53/551, 552, 554, 526, 527, 113, 128.1, 436, 472

[56] References Cited

U.S. PATENT DOCUMENTS

| | | |
|---|---|---|
| 2,989,783 | 6/1961 | Slapnik . |
| 3,389,195 | 6/1968 | Gianakos et al. . |
| 3,485,347 | 12/1969 | McGill et al. . |
| 3,634,565 | 1/1972 | Schaerer . |
| 3,644,606 | 2/1972 | Auge et al. . |
| 3,775,522 | 11/1973 | Auge . |
| 4,196,160 | 4/1980 | Sperry . |
| 4,552,601 | 11/1985 | Hirano et al. . |
| 4,674,268 | 6/1987 | Gavronsky et al. . |
| 4,800,708 | 1/1989 | Sperry ........................ 53/451 X |
| 4,854,109 | 8/1989 | Pinarer et al. ............. 53/451 X |
| 4,938,007 | 7/1990 | Sperry . |
| 5,027,583 | 7/1991 | Chelak ........................ 53/451 |
| 5,139,151 | 8/1992 | Chelak . |
| 5,335,483 | 8/1994 | Gavronsky et al. ........ 53/552 X |
| 5,376,219 | 12/1994 | Sperry et al. . |
| 5,393,361 | 2/1995 | Bareuter et al. . |

*Primary Examiner*—Horace M. Culver
*Attorney, Agent, or Firm*—Bell Seltzer Intellectual Property Group of Alston & Bird LLP

[57] ABSTRACT

An apparatus and associated method are disclosed for making a polymer foam cushioning element. The method comprises advancing a pair of sheets of plastic film material in parallel face-to-face relationship; injecting foam precursors between the advancing plastic sheets; sealing the sheets together to form a plastic bag containing the foam precursors; forming the bag into the shape of a panel; and thereafter maintaining the bag in the panel shape until the foam precursors have substantially finished expanding into foam to thereby form a foam cushion panel.

45 Claims, 5 Drawing Sheets

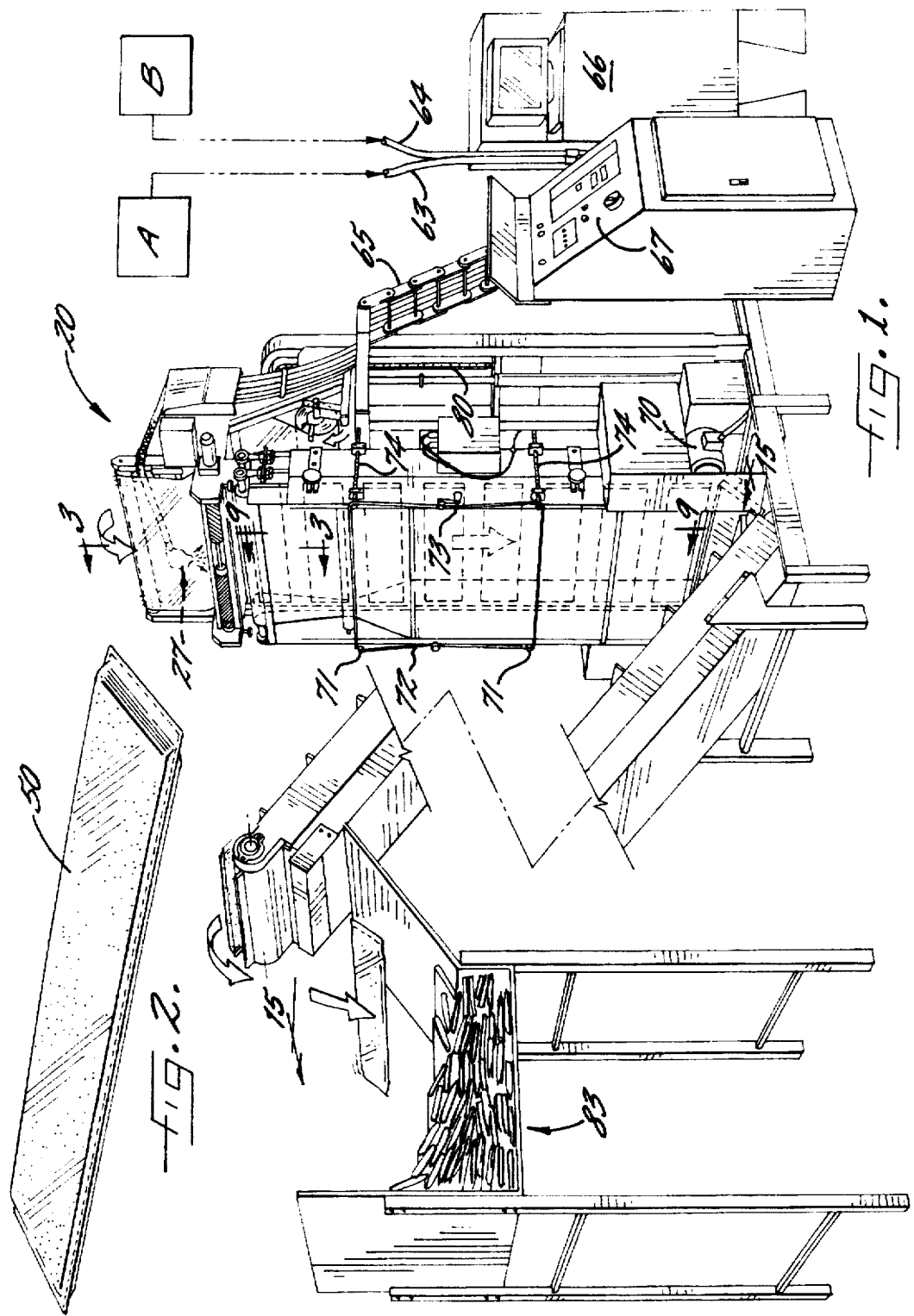

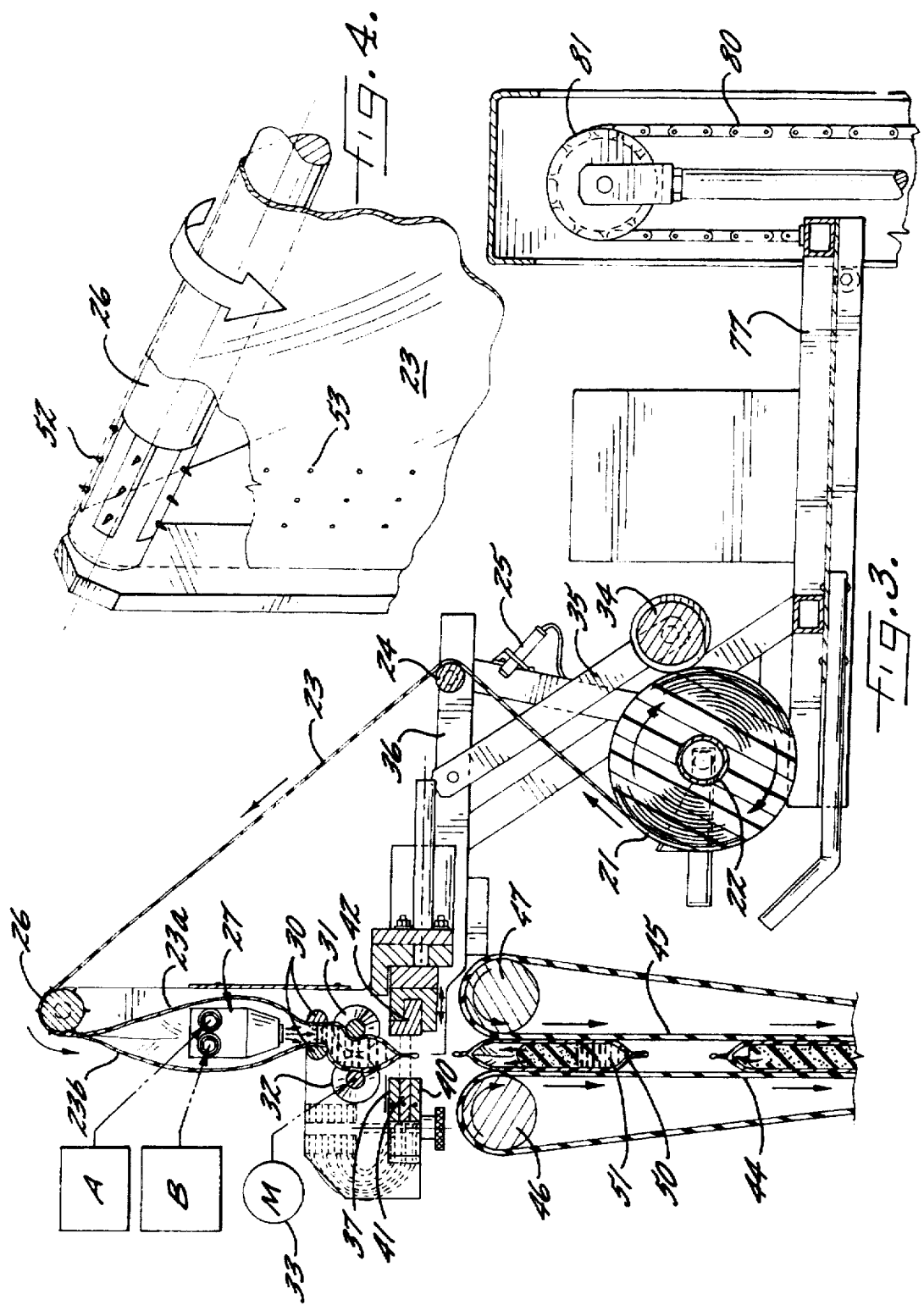

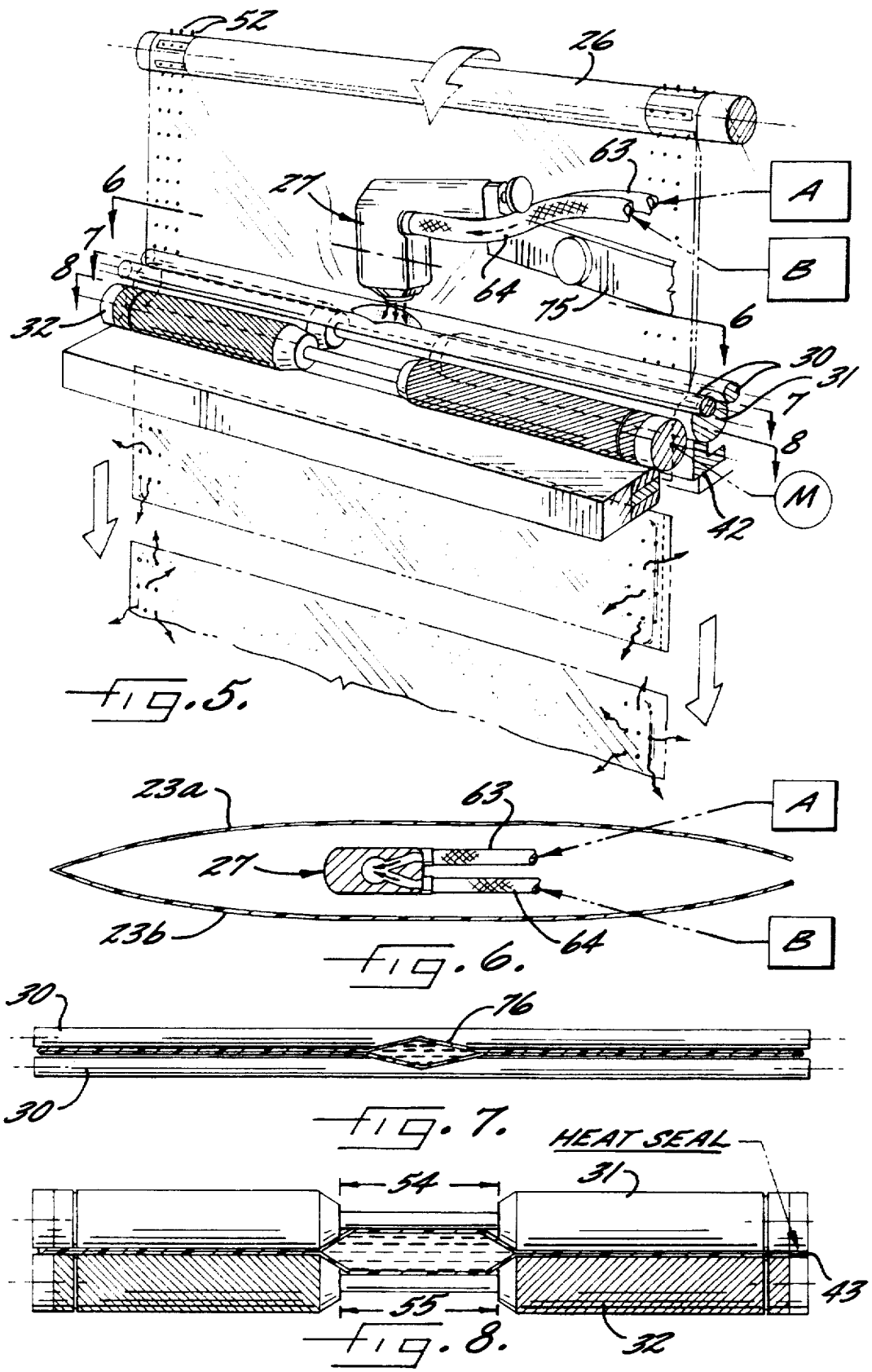

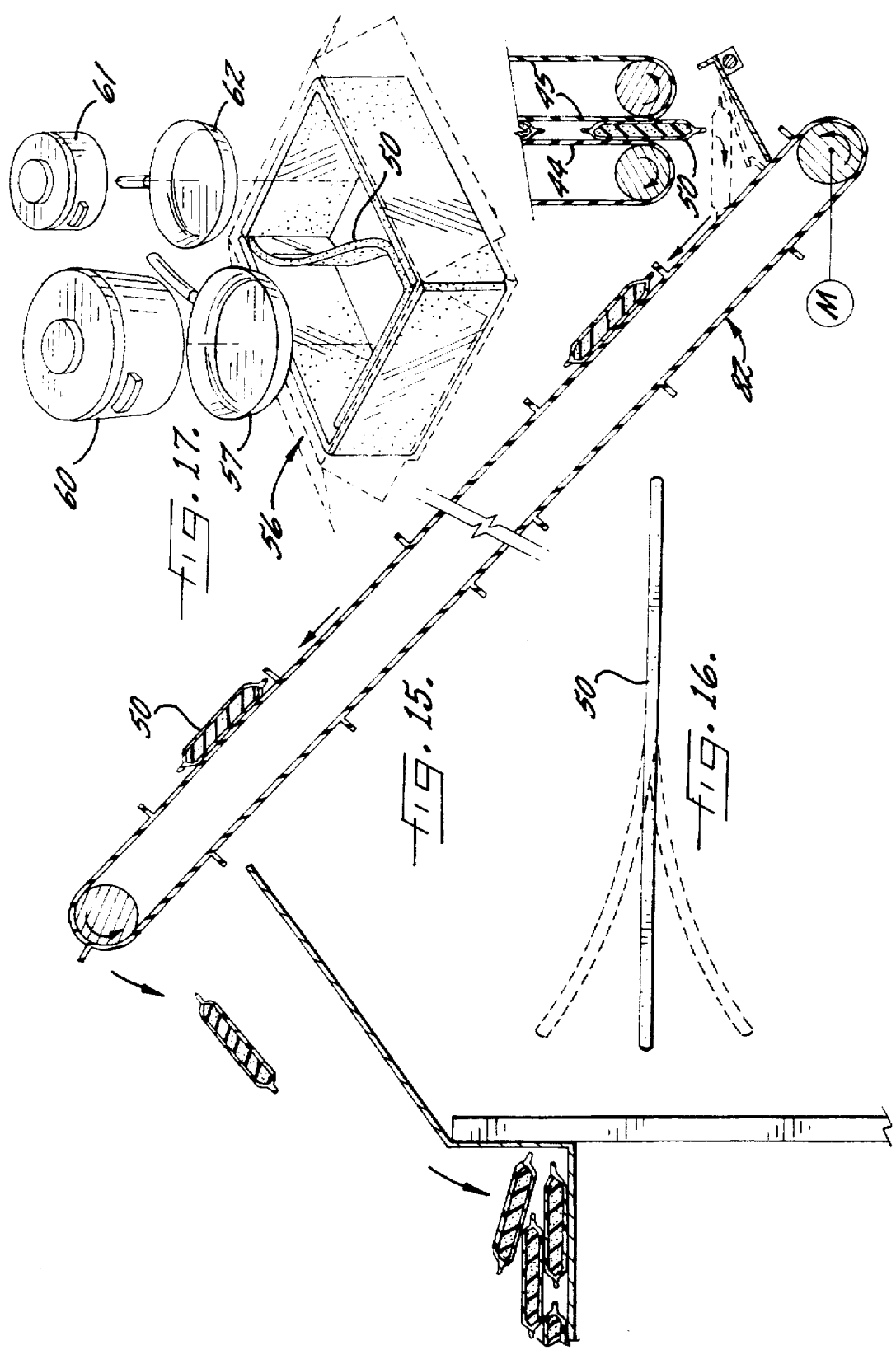

FOAM CUSHIONING PANELS FOR PACKAGING PURPOSES

FIELD OF THE INVENTION

The present invention relates to protective packaging techniques, and more particularly relates to an apparatus and method for forming foam panel cushions for packaging objects within containers.

BACKGROUND OF THE INVENTION

The present invention is related to foam-in-place packaging, and offers an alternative to high inventory packaging materials such as corrugated board forms and premolded polymer (e.g. polystyrene foam) packaging forms.

Foam-in-place packaging is a highly useful technique for on-demand protection of packaged objects. In its most basic form, foam-in-place packaging comprises injecting foamable compositions from a dispenser into a container that holds an object to be cushioned. Typically the object is wrapped in plastic to keep it from direct contact with the rising (expanding) foam. As the foam rises, it expands into the remaining space between the object and its container (e.g. a corrugated board box) thus forming a custom cushion for the object.

A common foaming composition is formed by mixing a diisocyanate with propylene glycol in the presence of some water and a catalyst. These precursors react to form polyurethane while at the same time generating carbon dioxide gas. As the gas escapes, it forms the foam cell structure that protects the packaged object.

In other types of foam-in-place packaging, the foam precursors are injected into a plastic bag which is then dropped into a container holding the object to be cushioned. The rising foam again tends to expand into the available space, but does so inside the bag. Because the bags are formed of flexible plastic, they foam individual custom foam cushions for the packaged objects. In several techniques, a specific apparatus is used to make the bag from plastic film while concurrently injecting it with foam. Exemplary devices are assigned to the assignee of the present invention, and are illustrated, for example, in U.S. Pat. Nos. 5,027,583 and 5,376,219.

Such foam-in-place packaging has gained wide acceptance in many industries. The nature of the technique and the cushions, however, are such that each individual cushion forms a shape that is dictated by a number of variables including the size and shape of the object being packaged, the size and shape of the container, the position of the object in the container, and the placement of the bag in the container before the foam finishes rising. As a result—and indeed as an advantage in many circumstances—each foam cushion tends to be a unique customized shape different from almost all other similar cushions. Any cushions that turn out similar or identical do so only by random chance. Accordingly, such random foam-in-place packaging cushions are highly sought after in packaging situations where different objects of different sizes and different shapes must be placed in different boxes on a regular basis. In such circumstances, cushions limited to specific shapes and sizes would represent a disadvantage rather than an advantage.

There are, however, other packaging applications in which similar or identical objects are repeatedly placed in similar or identical orientations in similar or identically sized containers. Such circumstances greatly decrease the need for continuously varying custom cushion sizes, and instead increase the need for more standard packaging elements that have a consistent size and shape.

To date, such standard packaging has been provided by several types of materials. Premolded polystyrene foam is one such common example, as are precut corrugated board (sometimes referred to colloquially as "cardboard"), pressed paper, and other similar materials.

Although such materials are quite useful, their precut (e.g. corrugated board) or premolded (e.g. polystyrene foam) nature requires maintaining an inventory of such materials that corresponds to the inventory of items to be packaged. Accordingly, in situations where a large number of objects must be packaged and shipped, a correspondingly large inventory of the packaging cushion materials must be kept in the immediate vicinity. Because the nature of most cushioning materials is such that they have a high ratio of volume to weight, they tend to take up a relatively large amount of space. Accordingly, such space must be provided and maintained in the immediate vicinity of inventory space that is required for the objects to be packaged.

OBJECT AND SUMMARY OF THE INVENTION

Therefore, it is an object of the present invention to provide cushioning materials that have a consistent size and shape for being used with large numbers of identical packages of identical products, and yet which avoid the necessary large volume of inventory required by the most typical standardized packaging cushions. Such a need also exists for such cushioning materials that can be made on demand, at relatively high speed, and in the immediate vicinity of the objects to be packaged and their overall containers.

The invention meets this object with a method and apparatus for making polymer foam cushioning elements. The method comprises advancing a pair of sheets of plastic film material in parallel face-to-face relationship, injecting the foam precursors between the advancing plastic sheets; sealing the sheets together to form a plastic bag containing the foam precursors; and advancing the bag between and in contact with a pair of substantially parallel conveyors while the foam precursors in the bag are expanding into foam to thereby form a foam cushion with surfaces that conform to the surfaces of the conveyors, a shape that conforms to the profile of the bag, and a thickness substantially determined by the spacing between the conveyors.

In another aspect, the invention comprises an apparatus for making such polymer foam packaging elements. The apparatus comprises means for advancing a pair of sheets of plastic film material in parallel face-to-face relationship; means for injecting foam precursors between the advancing plastic sheets; means for sealing the sheets together to form a plastic bag containing the foam precursors; a pair of substantially parallel adjacent conveyors; and means for advancing the bag between and in contact with the conveyors while the foam precursors in the bag are expanding into foam to thereby form a foam cushion with surfaces that conform to the surfaces of the conveyors, a shape that conforms to the profile of the bag, and a thickness substantially determined by the spacing between the conveyors.

In yet a third aspect, the invention comprises a method of packaging articles that comprises preparing a flexible foam cushioning panel by injecting foam precursors into a plastic bag; inserting the cushioning panel in a substantially vertical orientation into a packaging container; and placing an object to be packaged and protected in the container adjacent the vertically oriented cushioning panel.

3

The foregoing and other aspects, advantages and objects of the invention will be understood more clearly when taken in light of the accompanying drawings in which:

BRIEF DESCRIPTION OF THE DRAWINGS

FIG. 1 is a perspective view of an apparatus according to the present invention;

FIG. 2 is a perspective view of a cushioning panel according to the present invention;

FIG. 3 is a cross-sectional view of the apparatus taken along lines 3—3 of FIG. 1;

FIG. 4 is a partial perspective view of the vent-forming portions of the apparatus;

FIG. 5 is a partial perspective view of the film advancing and foam injecting portions of the apparatus, and illustrated in isolated fashion for clarity;

FIG. 6 is a cross-sectional view taken along lines 6—6 of FIG. 5;

FIG. 7 is a cross-sectional view taken along lines 7—7 of FIG. 5;

FIG. 8 is a top plan view taken along lines 8—8 of FIG. 5;

FIG. 15 is a cross-sectional view taken along lines 15—15 of FIGS. 1 and 2;

FIG. 16 is a side elevational view of a cushioning panel according to the present invention; and FIG. 17 is a partially exploded perspective view illustrating the packaging method of the present invention.

DETAILED DESCRIPTION OF THE PREFERRED EMBODIMENTS

Figures 9, 10, 11, 12, 13, 14:
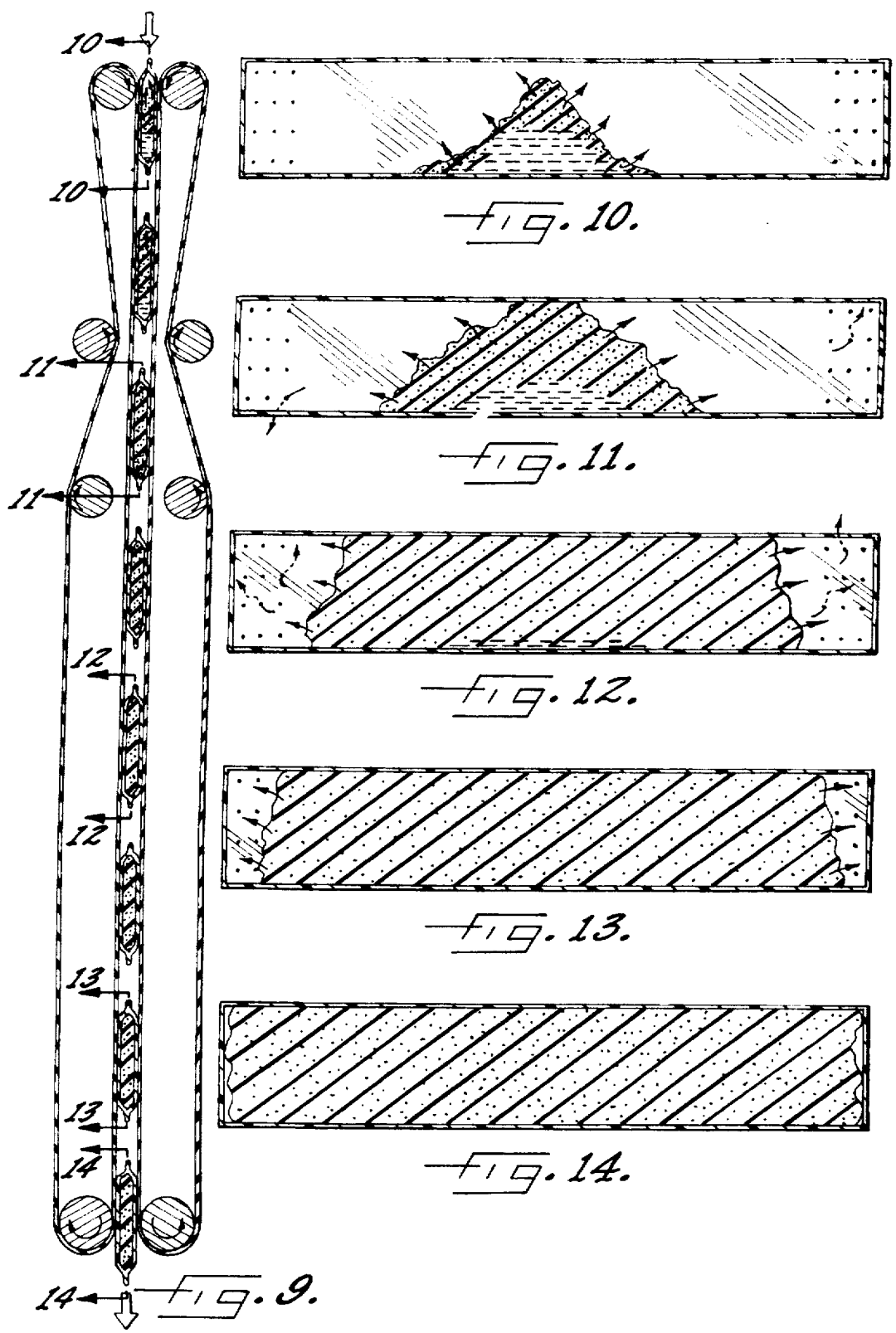
FIG. 9 is a cross-sectional view of the conveyor portion of the apparatus taken along lines 9—9 of FIG. 1.
FIG. 10 is a cross-sectional view taken along lines 10—10 of FIG. 9.
FIG. 11 is a cross-sectional view taken along lines 11—11 of FIG. 9.
FIG. 12 is a cross-sectional view taken along lines 12—12 of FIG. 9.
FIG. 13 is a cross-sectional view taken along lines 13—13 of FIG. 9.
FIG. 14 is a cross-sectional view taken along lines 14—14 of FIG. 9.

The present invention is an apparatus broadly designated at 20 in FIG. 1, for making polymer foam packaging elements. As illustrated therein, the apparatus 20 includes means for advancing a pair of sheets of plastic film material in face-to-face relationship. These means are generally similar in concept and execution to those advancing means illustrated and described in U.S. Pat. Nos. 5,027,583 and 5,376,219 which are assigned to the assignee of the present invention. Thus, for the sake of clarity in describing the present invention, such details will not be discussed in depth herein, other than is necessary to highlight the particular features of the present invention.

FIG. 3 illustrates the advancing means in somewhat more detail. As shown therein, in a preferred embodiment, the advancing means comprises means for advancing a single sheet of plastic film material that has been center-folded into a face-to-face relationship. FIG. 3 illustrates the supply roll of center-folded film material at 21 which is carried on an appropriate spool 22, which can include the telescoping plug described in assignee's issued U.S. Pat. No. 5,322,234.

4

It will be understood that in other embodiments, the advancing means can comprise means for bringing two separate sheets of plastic film material into a face-to-face relationship and thereafter advancing the sheets in the face-to-face relationship; e.g. as described in U.S. Pat. Nos. 5,027,583 and 5,376,219. Because the center-folded sheet is illustrated throughout the drawings, the remainder of the discussion will be in those terms, with the understanding that a number of the elements will be identical for an apparatus that uses two separate sheets of plastic film material.

The polymer film material is designated at 23, and in the illustrated embodiment passes from the supply roll 21 across an idler roller 24 which positions the film adjacent an optical detection device 25 which confirms the presence of the running film 23. If the film should break or the supply roll become empty, the optical detector 25 will signal the appropriate control system to stop the remainder of the machines operation until the film 23 is resupplied.

From the idler roller 24, the film 23 proceeds to a top roller 26 which is also illustrated in FIG. 4 and certain aspects of which will be described later herein. The film 23 then passes downwardly and separates at the injecting means broadly designated at 27 in FIGS. 1 and 3. As will be described in more detail herein, the injecting means dispenses foam precursors between the advancing plastic sheets which are designated 23a and 23b in their separated orientation.

After the foam precursors are injected, the sheets 23a and 23b proceed between a set of film guides 30 and then pass between a pair of driving rolls 31 and 32. As illustrated in FIG. 3, at least drive roll 32 is driven by the motor illustrated schematically at 33. It will accordingly be understood that the driving rolls 31 and 32 pull the film material 23 from the supply roll 21, thus causing it to advance as intended. An appropriate tension is maintained on the film 23 by a tensioning device, illustrated as a tensioning roller 34 which is free to rotate on a pivot arm 35 which in turn is attached to one of the frame members 36 of the apparatus 20. Other tensioning devices could be incorporated without departing from the scope of the invention or the claims herein.

FIGS. 1 and 3 also illustrate that in a preferred embodiment, the foam panels are formed from foam precursors schematically labelled as A and B in FIGS. 1 and 3. These precursors (as described earlier) are piped from their supply tanks to the injection means 27 where they mix and are immediately dispensed into the plastic bag being formed. The appropriate pumps and hoses are generally similar to those used in other foam-in-place system. Assignee's copending application Ser. No. 08/361,322 filed Dec. 21, 1994 and now U.S. Pat. No. 5,590,816 describes one such appropriate system.

FIG. 3 also illustrates the sealing means of the apparatus 20 which seals the sheets together to form a plastic bag containing the foam precursors. The sealing means comprises both means for transversely sealing the plastic sheets (i.e. perpendicular to the direction of advancement) -and means for longitudinally sealing the plastic sheets. It will accordingly be understood that where a center-folded film is used as in the illustrated embodiment, only a single longitudinal seal is required, while the use of two separate sheets will require two longitudinal seals analogous to the system shown in U.S. Pat. No. 5,376,219. FIG. 3 illustrates that the sealing means concurrently performs three functions: it seals the trailing edge of a completed bag; it seals the leading edge of the next succeeding bag; and it severs the bags from one another. These three steps can be carried out with a single heated wire, but in preferred embodiments of the invention, and as illustrated in FIG. 3, the transverse sealing means comprises two parallel metal heating strips 37 and 40 with a third metal strip (or a wire) 41 parallel to and positioned between the metal strips 37 and 40. Using this arrangement, the sealing means forms two separate seals in the plastic film material 23 and also severs the plastic film material 23 between the separate seals. As illustrated in FIG. 3, the metal strip 40 seals the trailing edge of a just-completed bag, the metal strip 37 seals the leading edge of the next successive bag, and the metal strip 41 severs a completed bag from the next successive bag. The sealing means includes an appropriate anvil 42, and either the metal strips 37, 40 and 41 or the anvil 42, or both, are laterally movable towards one another to engage and seal the plastic film 23 when desired and to retract and allow a bag to pass when desired.

The longitudinal seal required to complete the bag is carried out by a side sealing roller that is perhaps best illustrated in FIG. 8. FIG. 8 illustrates the drive rollers 31 and 32 and a heated metal strip or wire 43 that is carried by the edge of drive roller 32. When the wire strip 43 is heated, typically by passing electric current through it, it seals the plastic film material that passes adjacent to it. As noted-above, the illustrated embodiment has, only one such longitudinal seal because the plastic film material is center-folded. If two separate sheets are brought together, a corresponding edge seal is placed on the opposite end of drive roll 32.

The apparatus 20 further comprises means, illustrated as the pair of substantially parallel adjacent conveyors broadly designated at 44 and 45 in the drawings, for forming the bag into the shape of a panel and thereafter maintaining the bag in the panel shape until the foam precursors have substantially finished expanding into foam. The conveyors are driven in otherwise conventional fashion by means, shown as the rollers 46 and 47 that also advance the completed bag 50 between and in contact with the conveyors 44 and 45 while the foam precursors 51 in the bag are expanding into foam to thereby form a foam cushion with surfaces that conform to the surfaces of the conveyors 44 and 45 and in which the resulting cushion has a thickness substantially determined by the space between the conveyors 44 and 45. In the illustrated embodiment, the conveyors are belt conveyors and are formed of any suitable belting material that otherwise doesn't interfere with the remainder of the bag forming process.

FIG. 4 shows that the apparatus 20 further comprises means shown as the plurality of spike 52 on the top roller 26 for preparing a vent opening in the resulting bags 50 to permit the gases generated by the expanding foam to escape the bag. In foam-in-bag devices such as those illustrated in commonly assigned U.S. Pat. Nos. 5,027,583 and 5,376,219, the vent opening was typically prepared by temporarily refraining from sealing the plastic material as it was advancing to thus leave small unsealed portion of the edge from which gases could escape. In the present invention, however, it has been found preferable to form a plurality of much smaller openings in each bag rather than a single larger opening. As FIGS. 1, 3, 4, and 5 illustrate, placing the spikes 52 on the roller 26, causes the plastic film material 23 to pass over the spikes as it advances so that the spikes 52 form the plurality of small vent openings 53 in the plastic film material 23.

Because the object of the invention is the preparation of foam panels of a consistent size and shape, the preferred embodiment of the invention further comprises means for dispensing the foam precursors between the center portions of the plastic film material and for maintaining the precursors in the center portion of the plastic film material as the bag is being formed to thereby encourage the rising foam to expand evenly throughout the bag as the bag advances between the parallel conveyors. FIG. 8 illustrates that in the preferred embodiment of the invention, the same is best accomplished by including respective recessed center portions 54 and 55 in drive rolls 31 and 32. As FIG. 8 illustrates, because the drive rollers 31 and 32 are substantially adjacent except for the recessed portions 54 and 55, the foam precursors are initially and briefly limited to being placed in the center portions of the bag being formed.

As FIGS. 9 through 14 then illustrate, the foam then expands more consistently from the center portion of the bag 50 as the bags proceed between the conveyors 44 and 45 until the cushions are completed; e.g. FIG. 14.

It will be accordingly understood that in another aspect, the invention includes a method of making a polymer foam cushioning element by advancing a pair of sheets of plastic film material in parallel face-to-face relationship; injecting foam precursors between the advancing plastic sheets; sealing the sheets together to form a plastic bag containing the foam precursors forming the bag into the shape of a panel, and thereafter maintaining the bag in the panel shape until the foam precursors have substantially finished expanding into foam to thereby form a foam cushion panel.

In a preferred embodiment, the method comprises advancing the bag between and in contact with a pair of substantially parallel conveyors while the foam precursors in the bag are expanding into foam to thereby form a foam cushion with surfaces that conform to the surfaces of the conveyors, and that has a thickness substantially determined by the spacing between the conveyors.

It will be understood that by varying the spacing between the conveyors, the thickness of the panels can be similarly adjusted, and that the same can be accomplished by changing the width of the plastic film material 23 being fed.

If two separate sheets of film material are being fed, the step of sealing the sheets together will comprise sealing the sheets to form two sets of perpendicular parallel edges that defines a rectangular cushioning panel. Alternatively, if a single sheet of plastic film material that has been center-folded into parallel face-to-face relationship is advanced, the step of sealing the sheets will comprise forming two seals transverse to the centerfold of the center-folded sheet and one sealed parallel to the center-folded sheet. As illustrated in the drawings, the method further comprises the step of severing the bag from any remaining film material, and preferably prior to the step of entering the conveyors. Consistent with the apparatus aspects of the invention, the method can further comprise the step of preparing a vent opening in the bag to permit the gases generated by the expanding foam to escape.

Most preferably, the method aspects of the invention comprise successively making a plurality of polymer foam cushioning elements by advancing a pair of sheets of plastic film material, injecting foam precursors between the advancing plastic sheets, sealing the open longitudinal (i.e. longitudinal to the direction of advancement), side edges of the sheets; transversely sealing the sheets together to concurrently form the trailing transverse edge of one plastic bag containing foam precursors, the leading transverse edge of the next successive bag being formed, and to separate the completed bag from the next successive bag. As in the other embodiments, the separated bags are then advanced between and into contact with a pair of substantially parallel conveyors while the foam precursors in the bags are expanding into foam to thereby form foam cushions with surfaces that conform to the surfaces of the conveyors, and that have a thickness substantially determined by the spacing between the conveyors.

As illustrated by the apparatus of FIG. 3, the step of transversely sealing the sheets can comprise sealing the trailing transverse edge of one plastic bag, sealing the leading transverse edge of the next successive bag, and there severing the bags from each other between the two transverse seals.

Furthermore, as the bags 50 pass between the conveyors 44 and 45, the heat generated by the chemical reaction that forms the foam tends to heat the conveyors as well. In turn, the warmer conveyors affect the rate of chemical reaction of the foam precursors, thus the rate at which the foam expands, and thus the size of the resulting cushion. Accordingly, in preferred embodiments, the method can further comprise the step of moderating the temperature of the parallel conveyors to thereby moderate the rate of expansion of the foam precursors into foam. Depending upon the circumstances, the step of moderating the temperature can comprise heating the conveyors or cooling the conveyors as may be necessary or desired.

FIG. 17 illustrates another aspect of the method of the invention. FIG. 17 illustrates, a generally rectangular container 56 (in phantom lines) such as would typically be formed of corrugated board. Several objects to be protected are illustrated in FIG. 17 as the cookware items 57, 60, 61 and 62. In this aspect, the method comprises preparing a flexible foam cushioning panel 50 by dispensing foam precursors into a plastic bag; inserting the cushioning panel 50 in a substantially vertical orientation into the packaging container 56, and thereafter placing the objects 57, 60, 61 and 62 to be protected into the container adjacent the vertically oriented cushioning panel 50. In preferred embodiments, the step of preparing the panel 50 comprises preparing a rectangular panel from a rectangular plastic bag. FIG. 17 also illustrates that in preferred embodiments, a plurality of the cushioning panels 50 are placed in vertical orientation in the packaging container 56. In these preferred embodiments, at least one of the panels is placed along the side edge of the container, and one or more other panels are placed between two or more of the objects in the container 56. Because the panels are flexible, the method can comprise bending the flexible panel in the container to fit the items to be protected more easily into the container. The cookware 57, 60, 61, 62 illustrated in FIG. 17 is exemplary of the type of object for which the invention provides an optimum packaging option. Such cookware is typically very sturdy along its vertical orientation, but the sides of the cookware (particularly where enameled) are more much easily dented or damaged. Accordingly, the invention provides a method of cushioning the objects along the orientation where they are most likely to be damaged, while avoiding redundant use of cushioning where the objects are least likely to be damaged.

The drawings illustrate a number of other features of the invention. FIG. 1 shows that in preferred embodiments the conveyors 44 and 45 are preferably arranged in a vertical orientation which can encourage the foam to spread in a consistent fashion within each of the cushions being formed. FIG. 1 also illustrates that precursors A and B are piped to the apparatus 20 through appropriate pipes 63 and 64 which travel, along with some electrical wiring, along a wire and pipe support 65. The flow of materials and the various electrical signals required are controlled by appropriate hardware and software as illustrated by the computer console 66 and the control panel 67 illustrated in FIG. 1. FIG. 1 also illustrates an electric motor 70 for driving the belts, along with a series of sprockets 71 and chains 72 that can be used in conjunction with the crank 73 and the threaded adjustment bolts 74 to control and adjust the separation between the conveyors 44 and 45.

FIG. 5 is an isolated view of several of the elements previously described, including the top roller 26 and the venting spikes 52 that it carries. The injecting means 27 includes a continuation of the pipes (typically in the form of flexible and potentially heated hoses) 63 and 64 for chemical precursors A and B, respectively. The injecting means 27 is supported on an arm 75 otherwise attached to the frame of the apparatus 20 and as broadly illustrated in FIG. 6, permits both of the precursors A and B to enter separately and then be, distributed outwardly into the bag being formed. The assignee of the present invention is coassignee of a number of patents on such foam injection devices, including U.S. Pat. Nos. 4,898,327; 5,186,905 and 5,215,226, which are incorporated entirely herein by reference, which describe injection devices in some detail, and which will not otherwise be discussed in detail herein. Copending application Ser. No. 08/565,021 filed Nov. 30, 1995 for "Modular Narrow Profile Foam Dispenser" which is co-assigned with the present invention, offers a particularly illustrative injection device, and this application is likewise incorporated entirely herein by reference.

FIG. 5 also shows the film guides 30, as does FIG. 7, with FIG. 7 also illustrating that in preferred embodiments the guides have a slightly enlarged center opening portion 76 that permit foam precursors to pass from the injection means 27 into the bag being formed.

FIG. 5 also illustrates the drive rolls 31 and 32 described previously, the sealing strips 37, 40, and 41, and the anvil 42.

FIGS. 1 and 3 also show that the injection and driving portions of the apparatus 20 are positioned on a vertically movable platform 77, the height of which is adjusted by a chain 80 and sprocket 81 mechanism that is partially visible in FIG. 1, and more clearly illustrated in FIG. 3.

FIGS. 1 and 15 illustrate that in a preferred embodiment, the completed cushioning panels 50 exit the conveyors 44 and 45 and are then dropped onto a ladder conveyor 82 which carries them from the apparatus 20 to a potentially more convenient point of use. As illustrated in FIGS. 1 and 15, the completed panels 50 travel upwardly on the ladder conveyor 82 and are then dropped onto a collection table broadly designated at 83 from which they can be easily reached and used by operators using the packaged objects, or by other automated equipment in other circumstances.

FIG. 16 illustrates that the panels 50 can be made flexible and accordingly useful for particular packaging techniques as described earlier.

It will be understood that illustrative embodiments of the invention have been described herein, but that the scope of the invention and of the claims is not limited by the illustrated embodiments, but extends to equivalent structures as well.

That which is claimed:

1. A method of making polymer foam cushioning element, the method comprising:

advancing a pair of sheets of plastic film material in parallel face to face relationship;

injecting foam precursors between the advancing plastic sheets;

sealing the sheets together to form a plastic bag containing the foam precursors;

forming the bag into the shape of a panel by confining the bar between spaced apart substantially planar surfaces during the formation of foam within the bag by the foam precursors, the substantially planar surfaces being spaced apart a distance less than the expansion capacity of the foam during formation thereof; and removing the bar from between the substantially planar surfaces when the foam precursors have substantially finished expanding into foam to form a foam cushion panel.

2. A method according to claim 1 wherein the step of confining the bag between substantially planar surfaces comprises advancing the bag between and in contact with a pair of substantially parallel conveyors while the foam precursors in the bag are expanding into foam to form a foam cushion with surfaces that conform to the surfaces of the conveyors and that has a thickness substantially determined by the spacing between the conveyors.

3. A method according to claim 2 wherein the step of advancing the bag between the conveyors comprises advancing the bag between a pair of belt conveyors to produce a cushioning panel with substantially flat surfaces.

4. A method according to claim 1 wherein the step of sealing the sheets together comprises sealing the sheets to form a first set of parallel edges and a second set of parallel edges perpendicular to said first set that define a rectangular cushioning panel.

5. A method according to claim 1 wherein the step of advancing the sheets comprises advancing a single sheet of plastic film material that has been center folded into the parallel face to face relationship.

6. A method according to claim 5 wherein the step of sealing the sheets together comprises forming two seals transverse to the center fold of the center folded sheet and one seal parallel to the center folded sheet.

7. A method according to claim 1 wherein the step of advancing the sheets comprises advancing two separate sheets of plastic film material.

8. A method according to claim 1 and further comprising the step of severing the bag from any remaining film material.

9. A method according to claim 1 and further comprising the step of preparing a vent opening in the bag to permit the gases generated by the expanding foam to escape the bag.

10. A method of successively making a plurality of polymer foam cushioning elements, the method comprising:

advancing a pair of sheets of plastic film material in parallel face to face relationship;

injecting foam precursors between the advancing plastic sheets;

sealing open longitudinal side edges of the sheets;

transversely sealing the sheets together to concurrently form a trailing transverse edge of one plastic bag containing the foam precursors, a leading transverse edge of the next successive bag being formed, and to separate a completed bag from a next successive bag; and advancing the separated bags between and in contact with a pair of conveyors having substantially parallel, spaced apart surfaces while the foam precursors in the bags are expanding into foam to form foam cushions with surfaces that conform to the surfaces of the conveyors, and that have a thickness substantially determined by the spacing between the conveyors.

11. A method according to claim 10 wherein the step of advancing the bags between the conveyors comprises advancing the bags between a pair of belt conveyors to produce cushioning panels with substantially flat surfaces.

12. A method according to claim 10 wherein the step of advancing the sheets comprises advancing a single sheet of plastic film material that has been center folded into the parallel face to face relationship.

13. A method according to claim 12 wherein the step of sealing the open longitudinal side edges comprises forming a seal parallel to the center fold of the center folded sheet.

14. A method according to claim 10 wherein the step of advancing the sheets comprises advancing two separate sheets of plastic film material.

15. A method according to claim 14 wherein the step of sealing the open longitudinal side edges comprises forming two parallel seals, one along each side edge of the advancing sheets.

16. A method according to claim 10 wherein the step of transversely sealing the sheets comprises:

sealing a trailing transverse edge of one plastic bag;

sealing a leading transverse edge of the next successive bag; and severing the bags from each other between the two transverse seals.

17. A method according to claim 10 and further comprising the step of preparing vent openings in the bags to permit the gases generated by the expanding foam to escape the bags.

18. A method according to claim 17 wherein the step of preparing the vent openings comprises opening a plurality of small holes in a portion of the plastic film material.

19. A method according to claim 18 wherein the step of opening the plurality of small holes comprises puncturing the plastic film material prior to the step of injecting the foam precursors.

20. A method according to claim 10 wherein the step of injecting the foam precursors comprises:

injecting the foam precursors between center portions of the plastic film material; and maintaining the precursors in the center portions of the plastic film material as the bag is being formed to thereby encourage the expanding foam to spread evenly throughout the bag as the bag advances between the parallel conveyors.

21. A method according to claim 10 and further comprising the step of moderating the temperature of the parallel conveyors to thereby moderate the rate of expansion of the foam precursors into foam.

22. A method according to claim 21 comprising heating the conveyors.

23. A method according to claim 21 comprising cooling the conveyors.

24. An apparatus for making polymer foam packaging elements, the apparatus comprising:

means for advancing a pair of sheets of plastic film material in parallel face to face relationship;

means for injecting foam precursors between the advancing plastic sheets;

means for sealing the sheets together to form a plastic bag containing the foam precursors;

a pair of conveyors having substantially parallel, spaced apart surfaces; and means for advancing the bag between and in contact with the conveyors while the foam precursors in the bag are expanding into foam to thereby form a foam cushion with surfaces that conform to the surfaces of the conveyors and that has a thickness substantially determined by the spacing between the conveyors.

25. An apparatus for making polymer foam packaging elements according to claim 24 wherein said advancing means comprises means for advancing a single sheet of plastic film material that has been center folded into a face to face relationship.

26. An apparatus for making polymer foam packaging elements according to claim 24 wherein said advancing means comprises means for bringing two separate sheets of plastic film material into a face to face relationship and thereafter advancing the sheets in the face to face relationship.

27. An apparatus for making polymer foam packaging elements according to claim 24 wherein said injecting means comprises means for receiving, mixing, and injecting two separate foam precursors.

28. An apparatus for making polymer foam packaging elements according to claim 24 wherein said sealing means comprises means for transversely sealing the plastic sheets and means for longitudinally sealing the plastic sheets.

29. An apparatus for making polymer foam packaging elements according to claim 28 wherein said longitudinal sealing means comprises a heated roller on said advancing means.

30. An apparatus for making polymer foam packaging elements according to claim 28 wherein said transverse sealing means comprises a heated wire.

31. An apparatus for making polymer foam packaging elements according to claim 28 wherein said transverse sealing means comprises two parallel metal strips and a metal wire parallel to and between said metal strips for thereby forming two separate seals in the plastic film material and for severing the plastic film material between the separate seals.

32. An apparatus for making polymer foam packaging elements according to claim 24 and further comprising means for preparing a vent opening in the bag to permit the gases generated by the expanding foam to escape the bag.

33. An apparatus for making polymer foam packaging elements according to claim 32 wherein said vent opening means comprises a plurality of spikes on a feed roller on said advancing means, and over which spikes the plastic film material passes as it advances so that said spikes form a plurality of small vent openings in the film material and from which gases can escape as the foam precursors form foam.

34. An apparatus for making polymer foam packaging elements according to claim 24 and further comprising means for placing the foam precursors between center portions of the plastic film material and for maintaining the precursors in the center portions of the plastic film material as the bag is being formed to thereby encourage the expanding foam to spread evenly throughout the bag as the bag advances between the parallel conveyors.

35. An apparatus for making polymer foam packaging elements according to claim 34 wherein said centering means comprises a pair of opposed adjacent rollers in said advancing means and positioned downstream of said injecting means, each of said rollers having a recessed center portion that together define a centered opening through which substantially all of the foam precursors must pass as said bag is being formed.

36. An apparatus for making polymer foam packaging elements according to claim 24 wherein said conveyors comprise belt conveyors.

37. A method of packaging articles comprising:
providing a plastic bag; dispensing foam precursors into the plastic bags; forming the bag into a panel shape by confining the bag between spaced apart substantially planar surfaces until the foam precursors have substantially finished expanding into foam, the substantially planar surfaces being spaced apart a distance less than the expansion capacity of the foam;

inserting the foam in bag panel into a packaging container; and placing an object to be packaged and protected in the container adjacent the foam in bag panel.

38. A method according to claim 37 wherein the panel is a rectangular panel formed from a rectangular plastic bag.

39. A method according to claim 37 comprising placing a plurality of cushioning panels in vertical orientation into the container.

40. A method according to claim 38 comprising placing at least one panel along at least one side edge of the container.

41. A method according to claim 38 comprising placing at least one panel between two or more objects in the container.

42. A method according to claim 37 comprising bending the flexible panel in the container.

43. A method of making a polymer foam cushioning element, the method comprising:

advancing a pair of sheets of plastic film material in parallel face to face relationship;

injecting foam precursors between center portions of the advancing plastic sheets which center portions are between and spaced from opposite side edges of the film material;

forming a plurality of seals for joining the sheets together to form a plastic bag containing the foam precursors, and including forming at least one side seal extending alone one of the side edges of the sheets; and preparing a vent opening in the bag by forming a plurality of small holes in a portion of the plastic film material located between the center portions and the side seal, the small holes not extending into the center portions.

44. A method according to claim 43 wherein the step of opening the plurality of small holes comprises puncturing the plastic film material prior to the step of injecting the foam precursors.

45. An apparatus for making polymer foam packaging elements, the apparatus comprising:

means including at least one feed roller for advancing a pair of sheets of plastic film material in parallel face to face relationship;

means for injecting foam precursors between center portions of the advancing plastic sheets which center portions are between and spaced from opposite side edges of the film material;

means for sealing the sheets together to form a plastic bag containing the foam precursors and including means for forming at least one side seal extending along one of the side edges of the film material; and a plurality of spikes on said feed roller of said advancing means, and over which spikes the plastic film material passes as it advances so that said spikes form a plurality of small vent openings in the film material and from which gases can escape as the foam precursors form foam, said spikes being located on said feed roller so as to form the vent openings only in a portion of the film material disposed between the center portions and the side seal.

* * * * *

UNITED STATES PATENT AND TRADEMARK OFFICE
CERTIFICATE OF CORRECTION

PATENT NO.   : 5,794,406
DATED        : August 18, 1998
INVENTOR(S)  : Reichental et al.

It is certified that error appears in the above-identified patent and that said Letters Patent is hereby corrected as shown below:

On the title page, item [56]

In the References Cited, U.S. PATENT DOCUMENTS, please add the following references:

| | | |
|---|---|---|
| 2,610,134 | 09/1952 | Hoblick |
| 2,682,216 | 06/1954 | Shields |
| 3,545,983 | 12/1970 | Woods |
| 3,581,876 | 06/1971 | Keith |
| 3,987,602 | 10/1976 | Stahl |
| 4,637,199 | 01/1987 | Steck et al. |
| 4,938,003 | 07/1990 | Seppala |
| 4,999,975 | 03/1991 | Willden et al. |
| 5,112,632 | 05/1992 | Meli et al. |
| 5,473,866 | 12/1995 | Maglecic et al. |

Column 8, line 60, after making, insert --a--.

Column 9, lines 2 and 7, "bar" should be --bag--.

Column 11, line 68, "bags" should be --bag--.

Column 12, line 32, "alone" should be --along--.

Signed and Sealed this

First Day of December, 1998

Attest:

Attesting Officer

BRUCE LEHMAN

Commissioner of Patents and Trademarks